United States Patent [19]
Schwarz et al.

[11] Patent Number: 6,141,982
[45] Date of Patent: Nov. 7, 2000

[54] COLD CELL OR COLD CHAMBER

[75] Inventors: Jörn Schwarz, München; Torsten Schmidt, Woggersin; Andreas Grüner, Neubrandenburg; Gunnar Vierke, Neetzka, all of Germany

[73] Assignee: Tollense Fahrzeug- un Anlagenbau GmbH Neubrandenburg, Neubrandenburg, Germany

[21] Appl. No.: 09/352,283

[22] Filed: Jul. 13, 1999

[30] Foreign Application Priority Data

Jul. 17, 1998 [DE] Germany .................... 198 33 761

[51] Int. Cl.⁷ .................................................. F25D 15/00
[52] U.S. Cl. ............................. 62/237; 62/201; 62/451
[58] Field of Search .................... 62/237, 451, 177, 62/201, 434

[56] References Cited

U.S. PATENT DOCUMENTS 1,862,330  6/1932  Chapin et al. .
5,561,986 10/1996 Goodall ........................... 62/406
5,711,164  1/1998  Slack ............................. 62/457.9
5,765,389  6/1998  Salyer ............................ 62/434

*Primary Examiner*—William Doerrler
*Assistant Examiner*—Melvin Jones
*Attorney, Agent, or Firm*—Herbert Dubno

[57] ABSTRACT

A cooling cell, cabinet or chamber having hollow walls which have fitting at top and bottom which can be alternatively used as inlet and outlet for the fresh cooling medium and the depleted cooling medium and collected gas. In a first phase the fresh cooling medium is forced into the bottom of the hollow wall surface to drive out collected gas above the lighter phase of the previously used medium whereupon the fillings are functionally switched so that the fresh medium is introduced from above and the heavy phase of the depleted medium is discharged from the bottom to complete displacement of the latent cooling medium.

9 Claims, 3 Drawing Sheets

COLD CELL OR COLD CHAMBER

FIELD OF THE INVENTION

Our present invention relates to a method of operating a cold cell or cold chamber, receptacle or vessel and to an apparatus including the cold cell or the cold chamber which allows the cooling of articles, for example, biological samples or comestible products over periods of many hours and without necessarily connecting the receptacle to a power network. More particularly, the invention relates to the use of a latent cooling fluid, usually a liquid, which can be filled into hollow walls of the receptacle and which provides a form of stored cold to permit the cooling of an article in the absence of electric current supply and which can maintain a substantially homogeneous temperature distribution in the interior of the receptacle and hence can be associated with high quality cooling.

BACKGROUND OF THE INVENTION

Cooling cells and receptacles having extremely insulated hollow walls into which a fluid, usually a pumpable liquid, but frequently a slurry, carrying the latent cold can be introduced. The pumpable latent cooling medium can be stored in the hollow wall and can enter into heat exchange through the thermally conductive inner wall with the interior of the receptacle and can maintain the temperature of any optional article or substance which can be stored therein. The uniform cooling effect is maintained as long as the phase transformation of the latent cooling liquid continues. That transformation may be, for example, in the case of a slurry of ice in water or brine, the melting of the ice. When the phase transformation is complete, the used latent cooling fluid can be replaced by a fresh latent cooling fluid and the cooling process continued. The receptacle can be a fixed receptacle or a mobile receptacle and the system for supplying the fresh latent cooling fluid can be provided at a fixed location to which the receptacle can be moved.

During the cooling operation the specifically heavier phase, usually the phase resulting from the phase transformation, tends to settle toward the bottom of the hollow wall of the receptacle, while the lighter phase, usually the phase undergoing transformation tends to rise. The heavier phase having undergone transformation no longer tends to act as a heat sink capable of absorbing heat from the interior of the vessel.

With increasing phase transformation, as a result of this phase separation, the temperature distribution over the height of the vessel tends to become less uniform and as a result there may be nonuniform cooling of the contents of the receptacle. Nonuniform cooling, when it does arise may be in violation of regulations for the storage of certain articles or substances, for example biological materials or foodstuffs. It also may be undesirable and thus can be avoided by appropriate changeover or replacement of the latent cooling medium.

The latent cooling medium normally contains air or gaseous components which can be entrained in the pumped medium and during the cooling process tends to separate out and rise to the top of the hollow wall above the lighter phase therein.

In conventional refilling operations, this air and gas cannot be completely discharged and tends to accumulate additively with excessive replacement operations, thereby reducing the cooling capacity and cooling efficiency.

Efforts have been made in the past to reduce the collection of gas within the vessel wall and hence the reduction of capacity associated therewith by limiting the separation of, for example, the water and ice within the latent cooling fluid, e.g. by baffling the interior of the hollow walls or otherwise impeding the phase separation. The result is a zig-zag arrangement within the interior. This system does result in a uniform cooling effect upon the articles to be cooled but is associated with other drawbacks. For example, the structure is expensive to fabricate and is associated with a higher weight of the hollow wall receptacle. The flow resistance to displacement of the latent cooling fluid is high which can draw out or delay the filling operation. The zig-zag flow passages preclude simple discharge of the latent cooling medium and often require that the receptacle be tipped to effect complete discharge or require blowing out the medium with compressed air. The problem of gas build-up is only partially solved by this approach.

OBJECTS OF THE INVENTION

It is, therefore, the principal object of the present invention to provide an improved cold cell or cold receptacle with improved cooling homogeneity, minimum flow resistance to displacement of the latent cooling medium upon replacement and elimination of build-up of air and gas accumulation.

Another object of this invention is to provide an improved mobile cooing chamber which is free from drawbacks of earlier systems and, especially, can be fabricated at low cost and operated more efficiently than earlier systems.

SUMMARY OF THE INVENTION

These objects and others which will become apparent more readily hereinafter are attained, in accordance with the invention in a method of operating a cold cell or cold chamber having an upright hollow wall structure adapted to be filled with a replaceable latent cooling medium and in which the latent cooling medium is in heat-exchanging relationship with an internal space of the cell or chamber to be cooled. The method comprises the steps of:

(a) enabling unhindered separation of phases having different specific gravities of a latent cooling fluid in the wall over an entire height thereof during cooling of the internal space with the latent cooling liquid with a specifically heavier phase migrating toward a bottom of the wall, a specifically lighter phase migrating upwardly in the wall and air and gas separating from the latent cooling fluid collecting above the specifically lighter phase;

(b) for replacement of the latent cooling fluid by a fresh latent cooling fluid, feeding the fresh latent cooling fluid into the hollow wall from a bottom thereof while simultaneously discharging the air and gas collected above the latent cooling fluid therein from a top of the wall in a first replacement phase; and (c) thereafter feeding the fresh latent cooling fluid into the hollow wall from the top while simultaneously discharging the heavier phase of the latent cooling fluid in the wall from the bottom in a second replacement phase.

The apparatus comprises:

a cold cell or a cold chamber adapted to receive the article and having an upright hollow wall filled with a replaceable latent cooling fluid in heat-exchanging relationship with an internal space of the cold cell or the cold chamber, the hollow wall enabling unhindered separation of phases having different specific gravities of the latent cooling fluid in the wall over an entire height thereof during cooling of the internal space with a specifically heavier phase migrating toward a bottom of the wall, a specifically lighter phase migrating upwardly in the wall and air and gas separating from the latest cooling fluid collecting above the specifically lighter phase in the wall;

fittings at the bottom and on top of the wall communicating with the interior thereof; and means connected with the fittings and for functionally switching over the fittings so that either the fitting at the bottom of the wall can serve as an inlet and the fitting at the top of the wall can serve as an outlet or the fitting at the top of the wall can serve as an inlet and the fitting at the bottom of the wall as an outlet for latent cooling fluid.

The cooling cell or chamber of the invention thus comprises an insulated housing which has hollow walls and which can be closed by an insulated door. The hollow walls of the chamber are filled with the latent cooling medium, e.g. a pumpable slurry of water (usually brine and ice). The hollow walls of the chamber have inner surfaces in heat exchanging relationship with the interior of the chamber and preferably the cell or chamber has between one and five walls containing the latent cooling medium since the door itself is usually not cooled. The hollow walls, according to the invention are provided at their tops and bottoms with fittings which can be used selectively for supplying and discharging the latent cooling medium and the interior side walls can be provided with formations for receiving trays, or containers for the articles to be cooled and upon which the articles can be placed.

The article carriers themselves may be perforated or formed as an open work structure so that a free flow of air within the chamber is permitted, the free convection serving to render the cooling homogeneous and uniform.

Because of its lower density, warm air within the interior of the chamber tends to rise, becomes cooled as it transfers heat to the hollow walls, and falls in a convective flow as its density increases. As it abstracts heat from the articles to be cooled, it warms again and rises.

Simultaneously, there is a phase separation in the interior of the hollow walls with the heavier phase sinking and the lighter phase rising, the heavier phase tending to be warmer and the lighter phase tending to be colder. This process ensures that as the air warms within the interior of the chamber it will meet increasingly cooler surfaces of the hollow wall as it rises and thus the warmer air will always meet the coldest surfaces of the hollow wall and the interior will be cooled in an optimum manner.

The process has been found to readily be restored after a door opening and removal of articles and insertion of new articles. The cooling is rapid and uniform even in spite of such perturbations.

In the replacement operation according to the invention, in the first phase, fresh latent cooling medium is pumped into the hollow walls of the receptacle from below and accumulated air is discharged from the top. This ensures that all of the air which has accumulated and which might otherwise reduce the cooling capacity and cooling efficiency is displaced out of the hollow walls. Because of the density difference between the fresh and used latent cooling medium, there is no loss in volume of the fresh latent cooling medium added and the latent cooling medium of higher density is moved upwardly and there is a mixing of the two phases therein. After the air has been driven off, the second phase of the replacement operation is effected in which fresh latent cooling medium is pumped in from the top while the latent cooling medium of high density is discharged from the bottom. The phase of lesser density is then at the top of the hollow-wall space and the used latent cooling liquid of high density is displaced out of the container wall from the bottom. The refilling process can be terminated when, for example, a temperature sensor or density measurement indicates that substantially all of the heavy phase has been discharged and the hollow wall is filled with the replacement liquid cooling medium.

According to the invention, fittings at the top and bottom of the hollow wall for at least each segment thereof can be alternately used as the inlet or the outlet and these fittings can be connected by leakage-free or low-leakage quick-connect couplings with the latent cooling medium circulating system. That system can have cut off valves where required in the regions of the coupling. The quick connect couplings allow the receptacle to be permanently or temporarily connected to the latent cooling medium source and recycling system. The switchover means can be a multipath valve, preferably a four-way valve, or a combination of valves which essentially do the same thing. In the case of a four-way valve, two ports of the valve are connected to the fittings at the top and bottom of the hollow wall and one of the remaining ports is connected to a return line for the medium while the fourth port is connected to a source of the fresh medium.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
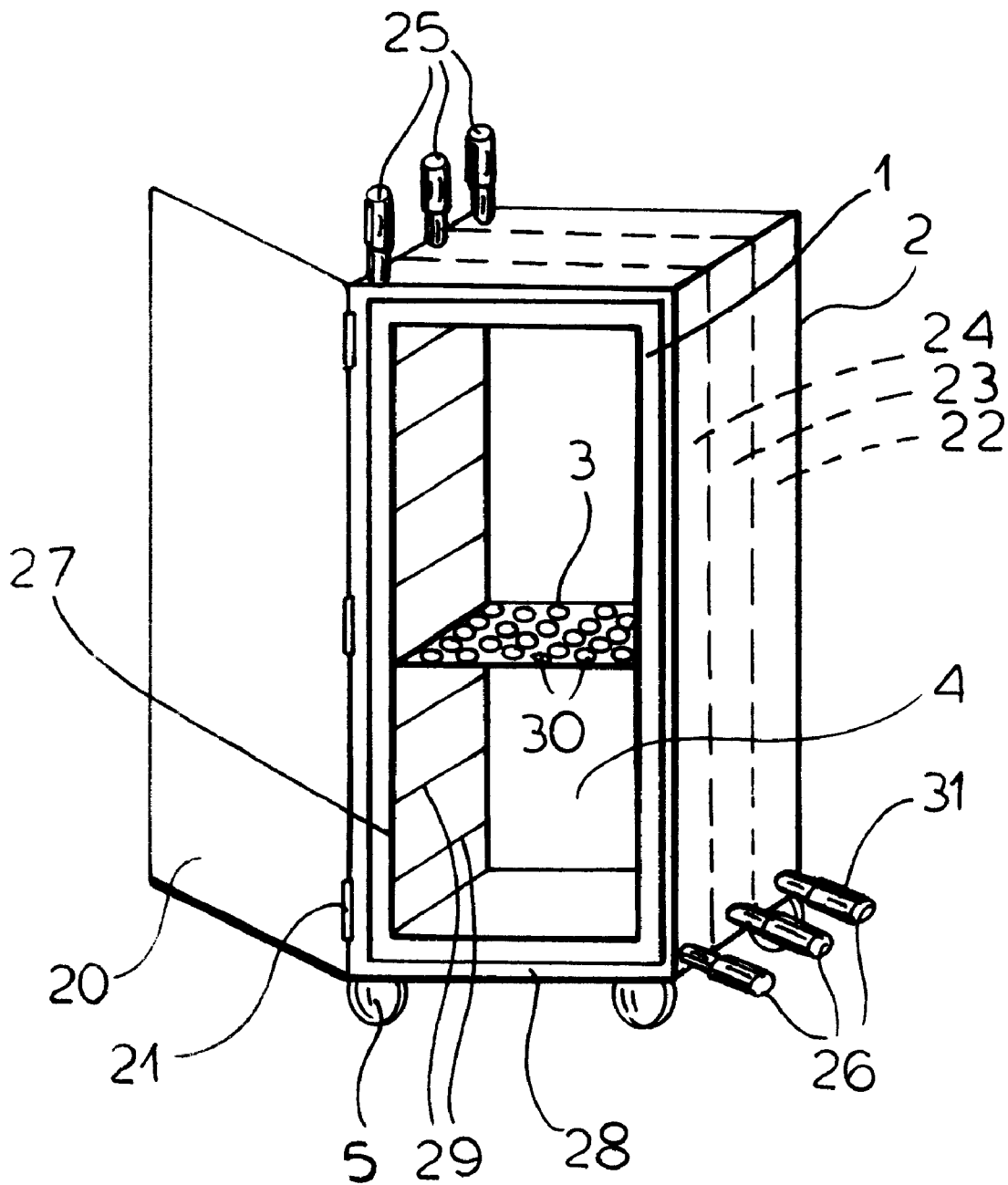
FIG. 1 is a perspective view of a mobile cooling vessel having a perforated shelf for receiving the articles to be cooled.

The mobile cooling cell 2 shown in FIG. 1 is mounted on rollers 5 to enable it to be displaced within a facility and has a door 20 connected by hinges 21 enabling access to the interior 4 of the housing. The latter is made up of hollow walls 1 which may be internally subdivided into individual segments 22, 23 and 24 and each segment can be provided with a fitting 25 at the top and a fitting 26 near the bottom of the respective hollow wall segment. The hollow walls are each defined between a heat exchanging inner wall member 27 and a thermally insulated outer wall member 28, the members 27 being provided with formations, e.g. grooves 29 or channels, ledges or the like adapted to receive a support 3 for the articles to be cooled. The support 3 can be, for example, a shelf which is provided with throughgoing openings 30. When the article carrier is a basket or other structure it may also be provided with lateral thoroughgoing openings to enable free convection within the interior space. The shelves 3 enable an ordered placement of the articles within the cooling chamber so as to permit the free convective flow of air therein and uniform cooling.

Figure 2:
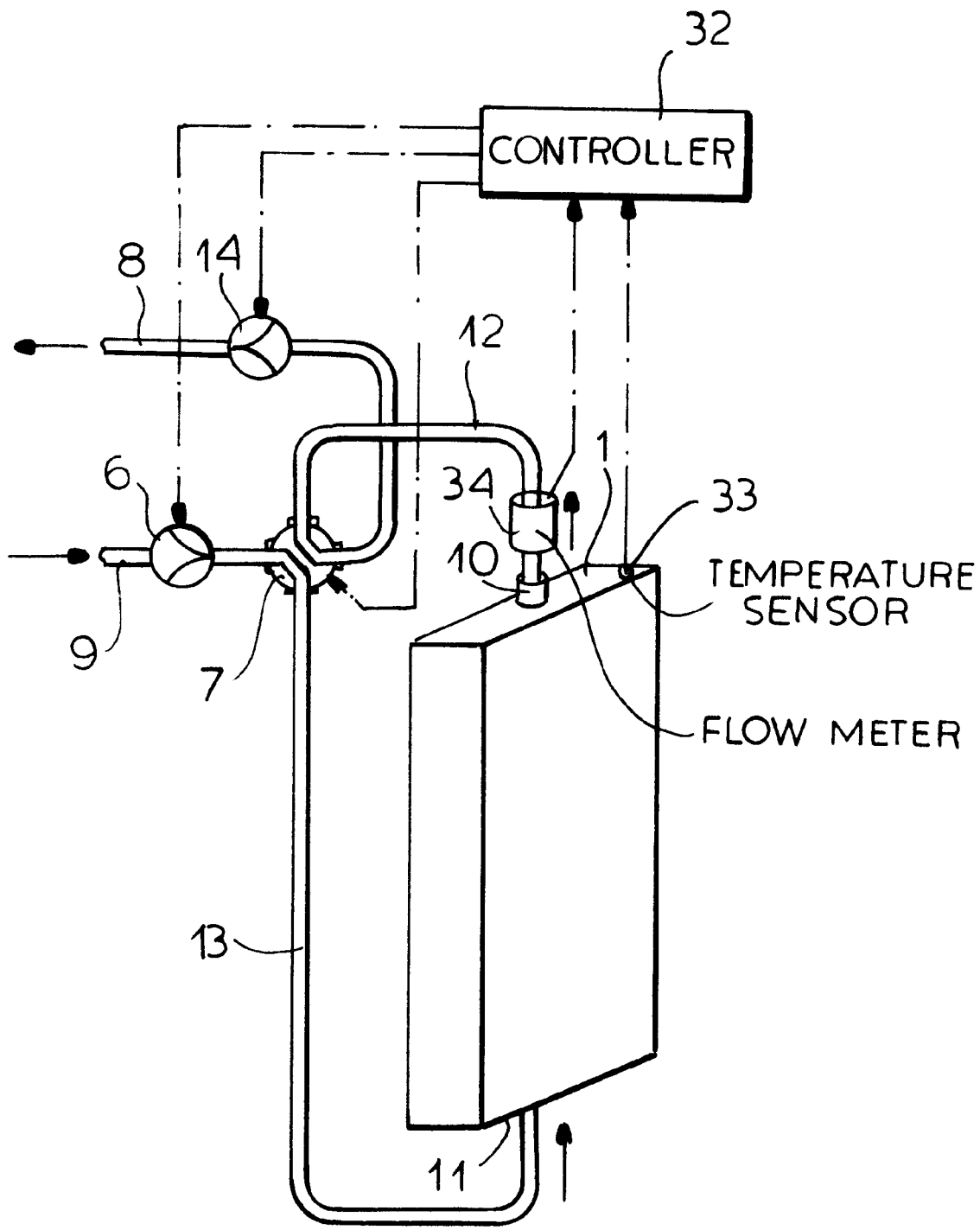
FIG. 2 is a diagram showing the first phase in the replacement of the latent cooling medium.

FIG. 2 shows the principles of the present invention in greater detail and here the cooling cell or hollow-wall receptacle 1, which can represent the multi-wall receptacle shown in FIG. 1 or some other cooling cell or receptacle, have respective upper and lower fittings 10, 11 connected to a conduit 12 or 13 and so configured that either fitting 10 or 11 can be an inlet or an outlet to the hollow wall space. In FIG. 1, the fitting 25 and 26 are shown to be formed with quick connect couplings 31 enabling them to be connected to the conduits 12 and 13 in a rapid manner and to be disconnected from the conduits when it is desired to move the cooling cell away from the source of the latent cooling medium.

The control for replacement of the latent cooling medium is effected via a multi-path valve 7 and in the embodiment illustrated the multi-path valve 7 is a four-way or four-port valve. One port each of the valve 7 is connected to the respective duct 12 and 13 while a third port is connected to the return line 8 which carries discharged gases and any overflowing medium back to the chilling apparatus while the fourth port is connected to a line 9 supplying the fresh latent cooling medium. Pumps 6 and 14 are provided for displacing the liquid cooling medium.

In the first phase of the medium replacement, from feedline 9 via pump 6, fresh latent cooling medium is fed via the valve 7 through line 13 to drive out air which has collected above the medium in the hollow wall spaces via line 12 and line 8. The effect of the pump 6 can be complemented by the pump 14. Thus, in the first phase, the multi-path valve 7 is so switched that the fresh latent cooling medium is fed via line 13 and the bottom fitting 11 serving as an inlet, from below into the hollow wall spaces of the container 1. This setting of the multi-path valve 7 is maintained as long as the air is driven out of the hollow wall space and passes via the upper fitting 10, acting as an outlet through line 12 and valve 7 to line 8.

Figure 3:
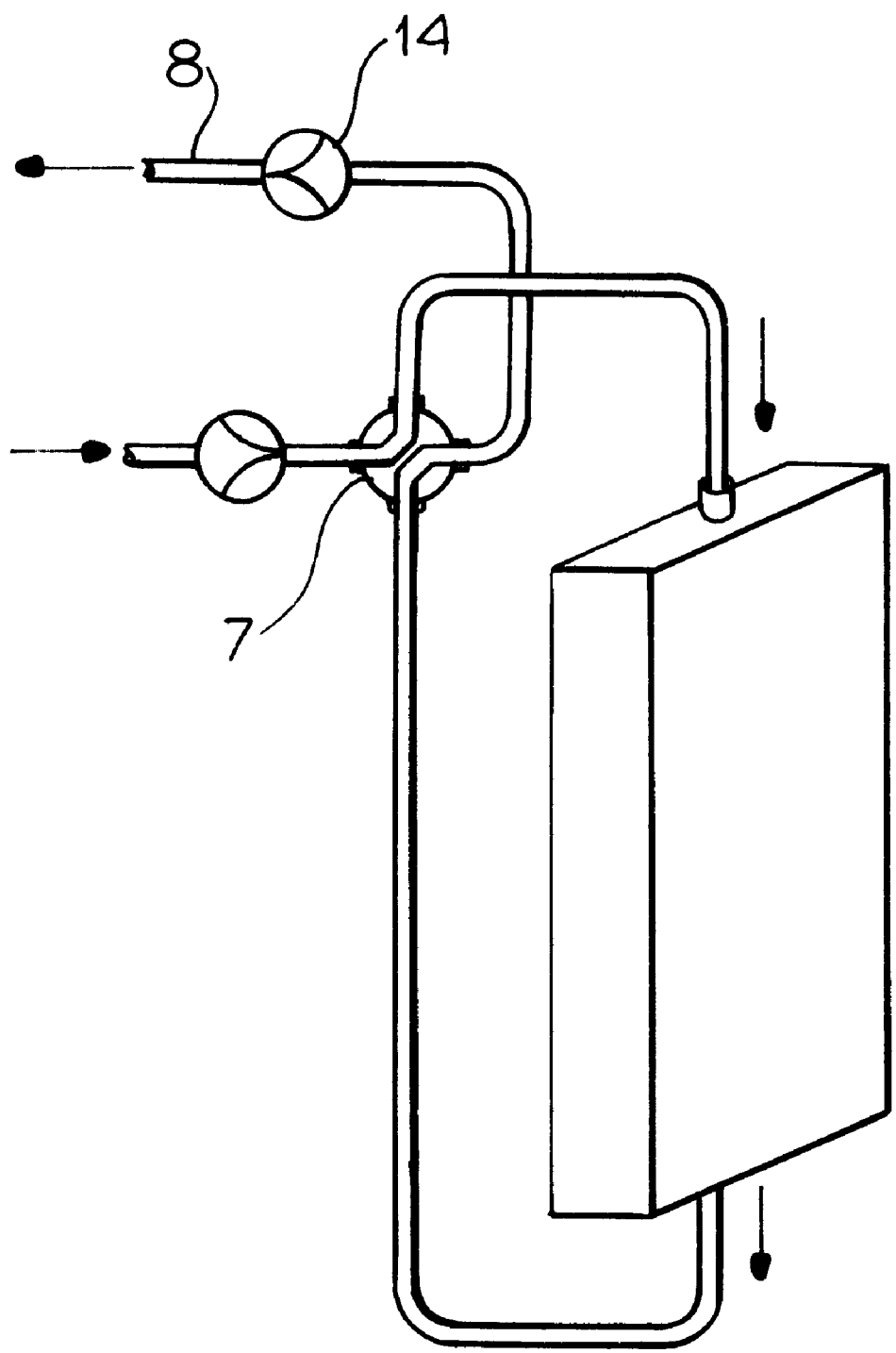
FIG. 3 is a diagram similar to FIG. 1 showing the second phase in the replacement.

When air has been completely driven out, as determined by a controller 32, which can be responsive to a temperature sensor 33 or a flowmeter 34 or a clock setting within the controller or an equivalent parameter, the phase two operation is conmmenced (see FIG. 3).

The multi-path valve 7 is switched over into its other position and fresh latent cooling medium is then fed from above into the hollow wall spaces while the heavy phase from the previous medium is displaced out from the bottom of the hollow wall space and returned to line 8 via line 7 and optionally the pump 14. This operation as well can be controlled on the basis of a predetermined time for filling, or based upon temperature or mass or volume measurements at appropriate points in the pipe system and with suitable sensors or signalling units.

When, as shown in FIG. 1, the hollow wall vessel 1 is comprised of a number of cooling segments, each of the segments has at least one inlet and at least one outlet or fitting at the top and bottom of the segment which can alternate in function as has been described.

We claim:

1. A method of operating a cold cell or a cold chamber having a hollow wall adapted to be filled with a replaceable latent cooling fluid and in heat-exchanging relationship with an internal space to be cooled, said method comprising the steps of:

(a) enabling unhindered separation of phases having different specific gravities of a latent cooling fluid in said wall over an entire height thereof during cooling of said internal space with said latent cooling liquid with a specifically heavier phase migrating toward a bottom of said wall, a specifically lighter phase migrating upwardly in said wall and air and gas separating from said latent cooling fluid collecting above the specifically lighter phase;

(b) for replacement of said latent cooling fluid by a fresh latent cooling fluid, feeding said fresh latent cooling fluid into said hollow wall from a bottom thereof while simultaneously discharging the air and gas collected above the latent cooling fluid therein from a top of the wall in a first replacement phase; and (c) thereafter feeding said fresh latent cooling fluid into said hollow wall from said top while simultaneously discharging said heavier phase of the latent cooling fluid in said wall from said bottom in a second replacement phase.

2. The method defined in claim 1 wherein the control of the replacement phase is effected as a function of time.

3. The method defined in claim 2 wherein the control of the replacement phase is effected as a function of temperature of the latent cooling fluid in said wall.

4. The method defined in claim 2 wherein the control of the replacement phase is effected as a function of the volume of the latent cooling fluid.

5. The method defined in claim 2 wherein the control of the replacement phase is effected as a function of the mass of the latent cooling fluid.

6. An apparatus for cooling an article comprising:

a cold cell or a cold chamber adapted to receive said article and having an upright hollow wall filled with a replaceable latent cooling fluid in heat exchange relationship with an internal space of said cold cell or said cold chamber, said hollow wall enabling unhindered separation of phases having different specific gravities of the latent cooling fluid in the wall over an entire height thereof during cooling of said internal space with a specifically heavier phase migrating toward a bottom of said wall, a specifically lighter phase migrating upwardly in said wall and air and gas separating from said latest cooling fluid collecting above the specifically lighter phase in said wall;

fittings at said bottom and on top of said wall communicating with the interior thereof; and means connected with said fittings and for functionally switching over said fittings so that either said fitting at the bottom of said wall can serve as an inlet and said fitting at the top of said wall can serve as an outlet or said fitting at the top of said wall can serve as an inlet and said fitting at the bottom of said wall as an outlet for latent cooling fluid.

7. The apparatus defined in claim 6 wherein said means connected with said fittings includes a multi-path valve.

8. The apparatus defined in claim 7 wherein said multi-path valve is a four-port valve having a respective port connected to each of said fittings, another port connected to a return line for air and replaced latent cooling fluid and a fourth port connected to a source of fresh latent cooling fluid.

9. The apparatus defined in claim 6 wherein said hollow wall is subdivided into a plurality of separate segments each having at least one fitting at a top thereof and at least one fitting at a bottom thereof selectively forming an inlet and an outlet.

\* \* \* \* \*